United States Patent [19]

Brown et al.

[11] Patent Number: 4,670,087

[45] Date of Patent: Jun. 2, 1987

[54] LABELING MACHINE

[75] Inventors: Amos W. Brown; Scott L. Sleeman, both of Bellevue, Wash.

[73] Assignee: Brown Packaging Inc., Beaverton, Oreg.

[21] Appl. No.: 636,822

[22] Filed: Aug. 1, 1984

[51] Int. Cl.[4] .............................................. B32B 31/00

[52] U.S. Cl. .................................... 156/212; 156/215; 156/356; 156/357; 156/446; 156/453; 156/458

[58] Field of Search ............... 156/212, 213, 215, 356, 156/357, 446, 451, 453, 458, 573, DIG. 9, DIG. 10, DIG. 11

[56] References Cited

U.S. PATENT DOCUMENTS

| | | | |
|---|---|---|---|
| 946,733 | 1/1910 | Phelps . | |
| 1,555,431 | 9/1925 | Murphy . | |
| 1,835,145 | 12/1931 | Cooke | 156/356 |
| 1,864,288 | 6/1932 | Wild | 156/356 |
| 1,995,306 | 3/1935 | Hesson . | |
| 2,171,085 | 8/1939 | Friberg | 156/356 |
| 2,468,922 | 5/1949 | Cook . | |
| 2,525,504 | 10/1950 | Von Hofe et al. . | |
| 2,623,628 | 12/1952 | Jones . | |
| 2,626,075 | 1/1953 | Hesson . | |
| 2,660,969 | 12/1953 | Woolford et al. . | |
| 2,804,303 | 8/1957 | Henthorn . | |
| 3,183,138 | 5/1965 | Mattingly et al. . | |
| 3,447,663 | 6/1969 | Sarovich . | |
| 3,472,722 | 10/1969 | Hutchinson . | |
| 3,607,568 | 9/1971 | Laub . | |
| 3,648,823 | 3/1972 | Neer . | |
| 3,787,267 | 1/1974 | Neer . | |
| 4,443,285 | 4/1984 | Roth et al. | 156/453 |
| 4,455,182 | 6/1984 | Roth et al. | 156/453 |

*Primary Examiner*—Caleb Weston

*Attorney, Agent, or Firm*—Seed and Berry

[57] ABSTRACT

An apparatus for applying labels to cans of a straight or substantially frustoconical design is disclosed. The apparatus uses an elongated track for supporting one edge of the can and a single belt extending longitudinally above the track and adapted to selectively engage an edge of the can to rotate and advance the can along the track. Movement of the can transverse relative to the track is restrained by retaining the can against a pair of spaced, longitudinally extending nonmagnetic guide surfaces. The can is retained against the guide surfaces through magnetic attraction of the can by a series of magnets positioned intermediate of but offset from the guide surfaces. As the can moves along the track, a suitable label is affixed to the surface of the can.

13 Claims, 5 Drawing Figures

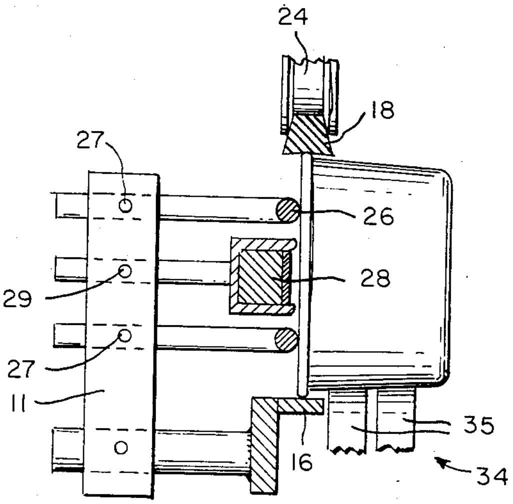
FIG. 3
FIG. 4
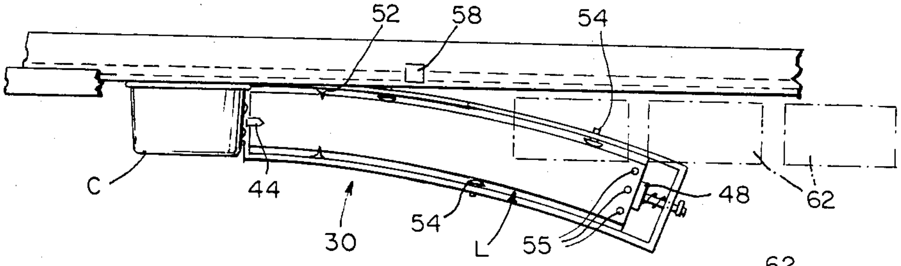
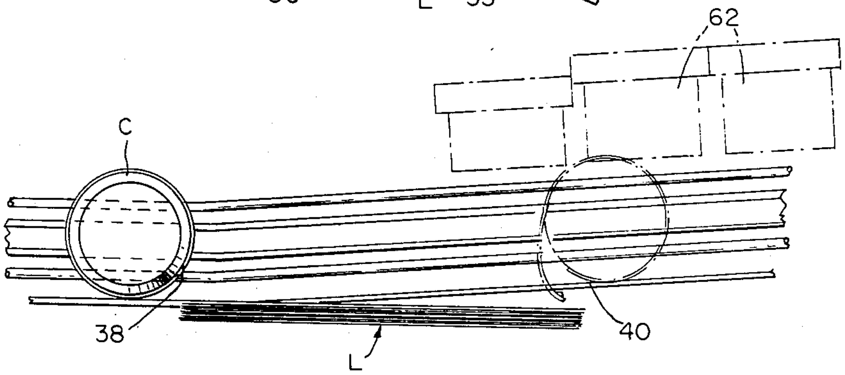
FIG. 5

LABELING MACHINE

TECHNICAL FIELD

The present invention relates to can labeling machines in general, and more particularly, to labeling machines which utilize magnetic attraction as a means of maintaining the position of a can as it is driven through the machine by a single belt engaging the edge of the can.

BACKGROUND ART

In conventional can labeling apparatus, the cans are caused to roll along and between a pair of guide rails which are positioned on opposite ends of the can. The cans are driven by a pair of endless belts which engage opposite edges of the can, or alternatively, the curved surface of the can. An alternative design to that noted above utilizes a pair of magnetic rail members which function to magnetically attract the curved surface of the can towards the rail members. Both of these designs have several disadvantages, among them the inapplicability of either design to the labeling of cans having a frustoconical design.

DISCLOSURE OF INVENTION

Briefly stated, the present invention consists of a can labeling apparatus having an elongated track for engaging and supporting an edge of a can at a first point on the edge and at least one driven belt extending longitudinally above the track and spaced apart from the track a distance sufficient to allow the can to stand intermediate of the track and the belt. The belt is adapted to selectively engage the edge of the can at a second point on the edge to rotate and advance the can along the track. In order to retain the can in position as it advances along the track, the invention utilizes a pair of spaced longitudinally extending nonmagnetic guide surfaces which are positioned to engage the can and restrain the movement of the can in a first transverse direction as the can moves along the track. A plurality of magnetics located substantially intermediate of but offset from and extending along the guide surfaces are adapted to magnetically attract the cans to restrain the movement of the cans in a second and substantially opposite transverse direction. The invention further includes means for affixing a label to the surface of the can as it moves along the track which include an applicator for applying a layer of adhesive to the can, a label feed adapted to successively position one label at a time in the path of the can, and an adhesive delivery head for applying a predetermined quantity of adhesive upon a rearward or trailing edge of the label such that the rearward edge will adhere to the can upon contact therewith.

The improved apparatus briefly described above may be used for two and three-piece straight sided cans as well as two-piece slanted or frustoconical cans.

Another aspect of the present invention consists of a method of applying a label to can utilizing the apparatus noted above. Briefly stated, the method consists of the steps of (1) delivering a can onto an elongated track which is adapted to engage and support an edge of the can at a first point on the edge; (2) engaging the can at a second point on the edge with a longitudinally extending belt to rotate and advance the can along the track; (3) simultaneously with engaging the can, restraining the movement of the can transverse relative to the track by retaining the can against a pair of spaced, longitudinally extending guide surfaces, the can retained through magnetic attraction provided by a series of magnets positioned intermediate of but offset from the guide surfaces; and (4) affixing a label to the surface of the can as it moves along the track.

Other objects and advantages of the invention will become apparent upon reading the following the detailed description and upon reference to the attached drawings.

BRIEF DESCRIPTION OF THE DRAWINGS

FIG. 3 is an enlarged partial end elevational view taken substantially along the line 3—3 of FIG. 1.

FIG. 4 is an enlarged plan view of a portion of FIG. 2 illustrating and showing a labeling feed mechanism.

FIG. 5 is an enlarged partial side elevational view of the machine of FIG. 1 showing and illustrating the rotation of a can over the labeling feed mechanism.

BEST MODE FOR CARRYING OUT THE INVENTION

Figure 1:
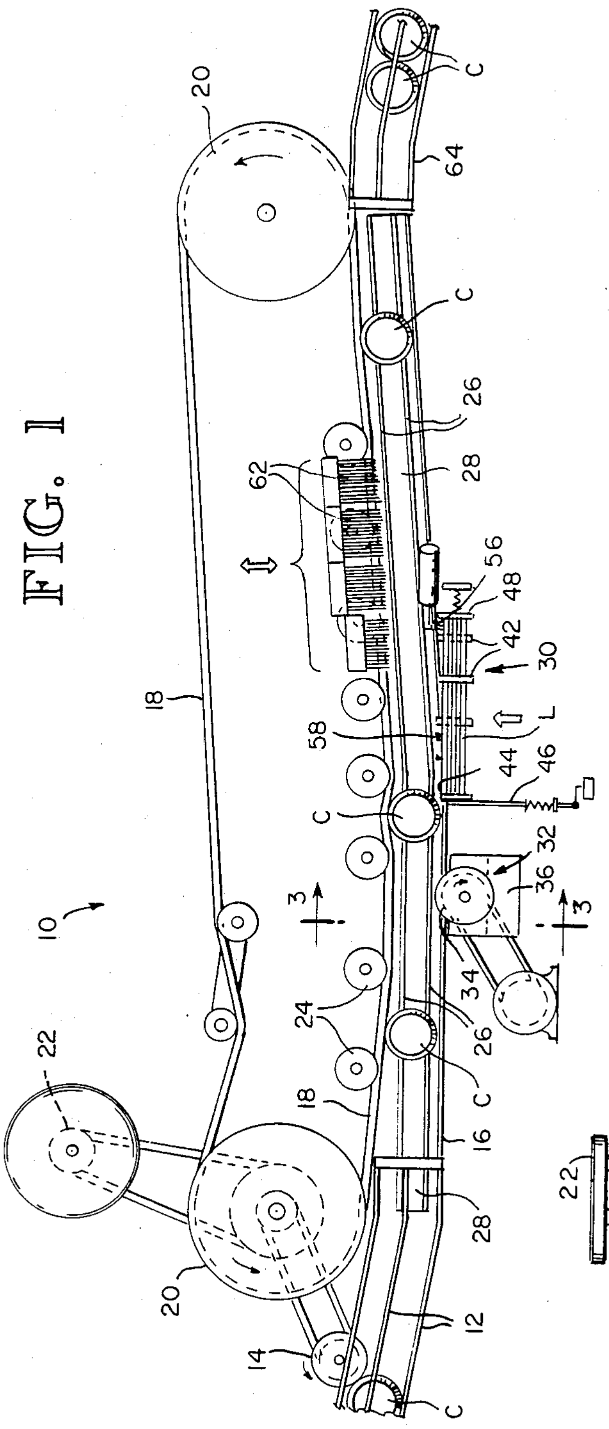
FIG. 1 is a side elevational of a labeling machine embodying the present invention.

As illustrated in FIG. 1 of the drawings, filled and sealed cans C are fed into the can labeling apparatus 10 of the present invention, which includes a frame 11, along a feed track 12 passed an adjustable spacing device 14 which functions to selectively release the cans at spaced intervals. The spacing device 14 rotates in a counterclockwise manner and is upwardly movable to allow the can to pass thereunder.

As the can approaches the end of the feed track 12, it engages an elongated supporting track or plate 16 which supports an edge of the can as the can is resiliently urged into contact with the track by a longitudinally extending endless belt 18. The support track 16 may be provided with a lip or similar such edge to more securely and accurately maintain the can in position.

The belt 18 is driven by a conventional pulley system which includes a pair of pulleys 20 positioned substantially toward opposite ends of the apparatus 10, one of the pulleys being driven by a motor 22. It is preferable to position the motor 22 at the forward end of the apparatus in order to provide means of concurrently driving the spacing device 14 along with the forward pulley 20. The belt 18 is maintained in position by a series of adjustable spring-loaded downwardly biased carrier rollers 24 which are positioned to engage the belt at suitable intervals.

In order to consistently maintain the position of the cans along the track, the cans engage a pair of spaced, substantially parallel nonmagnetic guide surfaces 26. The guide surfaces 26 extend longitudinally along and above the track 16 and are positioned to engage one end surface or edge of the can, thus limiting or restraining the movement of the can in a direction transverse to and toward the surfaces 26. The guide surfaces may be in the form of rails and composed of a suitable nonmagnetic, yet rigid and durable material. Preferably, the guide surfaces 26 are mounted for adjustable movement transverse relative to the apparatus to accomodate cans of varying dimensions. As shown in FIG. 3, the lateral adjustment of the guide surfaces may be accomplished, for example, by a set of set screws 27 fitted into apertures in the frame of the apparatus.

The can is retained in engagement with the guide surfaces 26 by a series of magnets 28 which are located substantially intermediate of but offset from the guide surfaces. The magnets act to magnetically attract the can into frictional engagement with the guide surfaces 26 but do not themselves come into contact with the edge or end of the can. Each magnet is preferably enclosed within a ceramic coating and is approximately 4 inches long, the magnets being arranged to lie end to end with each other intermediate of the guide surfaces 26. It is preferable to mount the series of magnets in an adjustable manner transverse relative to the apparatus to accomodate cans of varying dimensions. As best shown in FIG. 3, the lateral adjustment of the magnets may be accomplished, for example, by a set screw 29 fitted into an aperture in the frame of the apparatus.

As best shown in FIG. 3, when the magnets are positioned in relation to the guide surfaces in the manner noted above, the edge of the can is maintained in a location which ensures proper movement through the apparatus through engagement with the belt 18.

Referring back to FIG. 1, as the cans are driven along the track 16 and approach a label feed 30, a layer of suitable liquid adhesive is applied to the surface of the can by an applicator 32. As shown in FIGS. 1 and 3, the applicator may be in the form of a pick-up roller 34 mounted beneath the path of travel of the cans. The pick-up roller is in communication with a box 36 containing the adhesive, such as glue, which is preferably maintained and fed into the box at a constant temperature. For glue, the temperature is preferably around 350° F. The pick-up roller 34 may be selectively driven by a motor 38 through a drive belt 39 as shown in FIG. 1.

Figure 2:
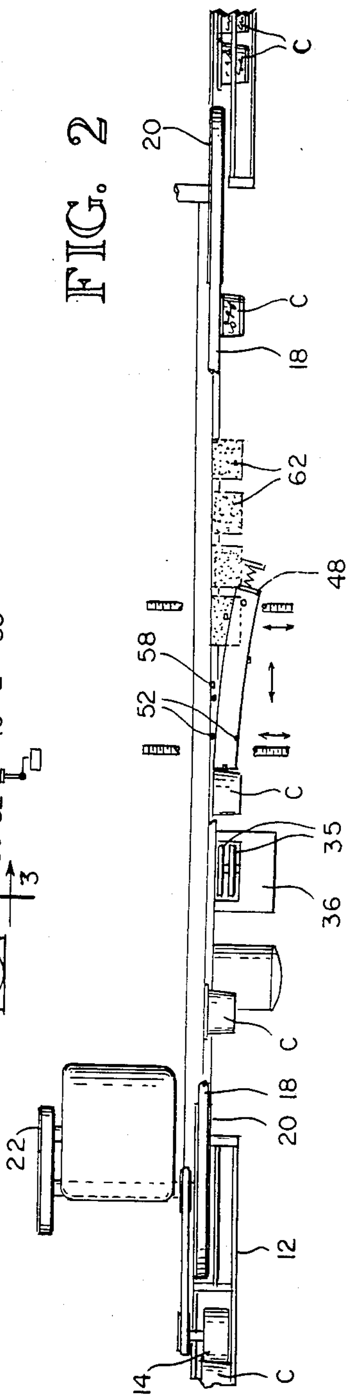
FIG. 2 is an overhead plan view of the machine of FIG. 1.

As illustrated in FIGS. 2 and 3, the pick-up roller 34 may be adapted to have a pair of spaced wheels 35 in order to limit the amount of contact of the roller with the periphery of the can body. As the can passes over the spaced wheels 35, the glue is transferred onto the peripheral surface of the can in the form of a pair short glue spots aligned longitudinally of the can.

Referring now to FIGS. 1 and 2, the label feed 30 is positioned a distance from the applicator 32 sufficient to allow the can to substantially complete one revolution as it rotates along the track from the applicator to the label feed.

As best shown in FIG. 1, the label feed 30 supports a stack of labels L below the path of travel of the cans and, as noted above, is spaced downstream on the frame of the apparatus from the applicator so that a can body with glue spots 38 (best shown in FIG. 5) applied to it is presented to the label feed in a position to engage and receive the leading edge of the uppermost label 40 in the label feed.

The label feed 30 includes a series of vertically extending side rails 42 which are positioned on both sides of the stack of labels and serve to limit the lateral movement of the labels. The stack of labels may be supported from the bottom in any conventional manner which continuously pushes the labels in an upward manner as signified by the arrow in FIG. 1. At the leading edge of the labels within the label feed is a finger 44 which aids in limiting the upward movement of the labels, and, more importantly, selectively adjusts and maintains the front height of the uppermost label. It is preferable to secure the position of the finger 44 onto the surface of the uppermost label through the use of an adjustable spring-loaded rod 46 as shown in FIG. 1.

Located at the rearward edge of the stack of labels is a spring-loaded pressure plate 48 which functions to maintain the position of the labels in a forward manner. The position of the plate 48 is adjustable to accomodate labels of different lengths.

Projecting inward of the side rails 42 are a pair of sharpened knife edges 52. The knife edges project inwardly beyond the inner surfaces of the side rails into engagement with the uppermost label in the stack of labels. In cooperation with the knife edges 52 are a series of adjustable stops 54, best shown in FIG. 4. The stops 54 also project inwardly from the rails 42 above the labels and cooperate with the knife edges and the finger 44 to retain the uppermost label at selected portions of its outer periphery, making it relatively easy to remove a label from the top of the stack.

It is important, as the can advances along the track 16, that the glue spots 38 applied to the can by the applicator are positioned immediately above the leading edge of the uppermost label in the stack as the can rolls over the stack. Accordingly, the relative position of the applicator 32 and the label feed 30 should be such that when the can is rotated 360° after application of the glue spots, the glue spots on the can will be directly above the leading edge of the uppermost label in the label feed.

As the can reaches the leading edge of the uppermost label in the label feed, it passes under a carrier roller 24 which serves to maintain pressure on the can as it passes over the label, causing it to firmly press against and adhere to the uppermost label in the label feed. This results in positive contact of the uppermost label with the glue spots on the can regardless of the number of labels in the label feed.

As shown in FIG. 5, continued forward rotation of the can over the label feed will pull the attached label upwardly against the knife edges 52 and stops 54 causing the knife edges to slice through the side edges of the label. This leaves only a small, almost imperceptible cut in the side edges of the label.

Simultaneous with the forward rotation of the can over the label feed, a series of glue dots 55 are applied to the rearward or trailing edge of the label by a delivery head 56. The delivery of the glue dots may be actuated by energizing an electronic sensor 58, such as a diffused reflective sensor, positioned substantially adjacent to the track just rearward of the knife edges 52. As the can passes by the sensor 58, the sensor becomes energized, transmitting a signal which actuates the delivery of glue through the head 56.

Continued forward movement of the can away from the label feed will pull the label away from engagement with the rearwardly positioned stops 54. Through rotation of the can, the trailing edge of the label is then brought into contact with the outside surface of the leading edge of the label in an overlapping manner.

In order to further secure the label to the can, the apparatus may be provided with a series of yieldable brushes 62 which press downward to frictionally engage the the label while on the can. The wiping action provided by the brushes, which are preferably adjustable and replaceable, ensures good adhesive contact of the glued edges with the can.

In one embodiment of the invention specifically directed toward labeling cans which are substantially frustoconical in form, the label feed is adapted to retain and deliver curved labels in the manner noted above as shown in FIG. 4, while the track is adapted to incline in an upward manner as shown in FIG. 1. This design allows the curved label to wrap around the surface of the can as the can rotates along the track without substantial interference.

As the labeled can leaves the rear end of the track 16, it exits by means of an exit assembly 64, adapted to allow the can to be conveyed to some subsequent can handling apparatus.

From the foregoing, it will be appreciated that, although certain embodiments of the invention have been described herein for purposes of illustration, various modifications may be made without deviating from the spirit and scope of the invention. Accordingly, the invention is not limited except as by the appended claims.

We claim:

1. An apparatus for labeling cans, comprising:
an elongated track for engaging and supporting an edge of a can at a first point on the edge;
a single driven belt extending longitudinally above said track, said belt spaced apart from said track a distance sufficient to allow said can to be intermediate of said track and said belt, said belt adapted to selectively engage the edge of the can at a second point on said edge to rotate and advance said can along the track;
a pair of spaced longitudinally extending nonmagnetic guide surfaces, said guide surfaces positioned to engage said can and restrain the movement of said can in a first transverse direction as the can moves along the track;
a plurality of magnets located substantially intermediate of but offset from and extending along said guide surfaces, said magnets adapted to magnetically attract said cans to restrain the movement of said cans in a second transverse direction, said second direction being substantially opposite of said first direction;
and means for affixing a label having a first edge and a second edge to the surface of said can as it moves along said track.

2. The apparatus of claim 1 wherein said affixing means includes an applicator for applying a layer of adhesive to said can such that a first edge of said label will adhere to said can upon contact therewith.

3. The apparatus of claim 2 wherein said affixing means includes a label feed adapted to successively position one label at a time in the path of said can at a distance from said applicator sufficient to allow said can to substantially make one complete revolution in rotating along said track from the applicator to the first edge of said label.

4. The apparatus of claim 3 wherein said can is of a substantially frustoconical form and said track inclines upwardly rearward of the forward edge of the label feed, said label feed being adapted to retain and deliver curved labels onto the surface of the can.

5. The apparatus of claim 1 including an adhesive delivery head for applying a predetermined quantity of adhesive upon a second edge of said label such that said second edge will adhere to said can upon contact therewith.

6. The apparatus of claim 5 wherein said adhesive delivery head is actuated by the cooperation between said can and an electronic sensor positioned substantially adjacent to said track.

7. The apparatus of claim 1 wherein said belt is maintained in position by means of a series of spring-loaded carrier rollers.

8. The apparatus of claim 1 including a series of yieldable brushes for frictionally engaging the surface of said can after a label has been deposited thereon, said brushes adapted to contact said label with a wiping action for further securing said label to said can.

9. The apparatus of claim 1 including means for selectively feeding cans onto said track.

10. An apparatus for labeling cans, comprising:
an elongated track for engaging and supporting an edge of a can at a first point on the edge;
a single driven belt extending longitudinally of said track for rolling a can along said track;
at least one longitudinally extending nonmagnetic guide surface, said guide surface positioned to engage said can and restrain the movement of said can in a first transverse direction as the can moves along the track;
a plurality of magnets located along said guide surface, said magnets being positioned to magnetically force said can against each guide surface for holding the can between said belt and said track; and
means for affixing a label to the surface of said can as it moves along said track.

11. A method of applying a label to a can, comprising the steps of:
delivering a can onto an elongated track, said track adapted to engage and support an edge of the can at a first point on the edge;
engaging said can at a second point on said edge with a longitudinally extending belt to rotate and advance said can along the track, said belt spaced apart from said track a distance sufficient to allow said can to stand intermediate of said track and said belt;
restraining the movement of said can transverse relative to the track by retaining said can against a pair of spaced, longitudinally extending nonmagnetic guide surfaces, said can retained through magnetic attraction provided by a series of magnets positioned intermediate of but offset from the guide surfaces; and
affixing a label to the surface of said can as it moves along the track.

12. The method of claim 11 including applying a layer of adhesive to said can such that a first edge of said label will adhere to said can upon contact therewith.

13. The method of claim 12 including applying a predetermined quantity of adhesive upon a second edge of said label such that said second edge will adhere to said can upon contact therewith.

* * * * *